United States Patent

Dassen et al.

[11] Patent Number: 5,533,865
[45] Date of Patent: Jul. 9, 1996

[54] WIND TURBINE

[75] Inventors: Antonius G. M. Dassen, Vollenhove; Franklin Hagg, Alkmaar, both of Netherlands

[73] Assignee: Stork Product Engineering B.V., Netherlands

[21] Appl. No.: 319,107

[22] Filed: Oct. 6, 1994

[30] Foreign Application Priority Data

Nov. 4, 1993 [NL] Netherlands ............... 9301910

[51] Int. Cl.⁶ ..................................... F04D 29/38
[52] U.S. Cl. ................. 416/228; 416/236 R; 244/199; 244/200
[58] Field of Search ............. 416/62, 228, 236 R; 244/198, 199, 200

[56] References Cited

U.S. PATENT DOCUMENTS

| 175,355 | 3/1876 | King | 416/228 |
| 1,862,827 | 6/1932 | Parsons et al. | 416/228 |
| 2,800,291 | 7/1957 | Stephens | 244/200 |
| 3,365,126 | 1/1968 | Stoffer et al. | 416/228 |
| 4,089,618 | 5/1978 | Patel | 416/228 |
| 4,813,633 | 3/1989 | Werle et al. | 416/236 R |
| 4,830,315 | 5/1989 | Presz, Jr. et al. | 244/199 |
| 5,074,376 | 12/1991 | Powell | 416/228 |
| 5,088,665 | 2/1992 | Vijgen et al. | 244/200 |

FOREIGN PATENT DOCUMENTS

| 0789883 | 1/1958 | United Kingdom | 416/236 |
| 1541108 | 2/1979 | United Kingdom | B64C 3/10 |
| 2105791 | 3/1983 | United Kingdom | F04D 29/66 |
| 2232724 | 12/1990 | United Kingdom | B63H 1/26 |
| WO9103623 | 3/1991 | WIPO | F01D 5/00 |

OTHER PUBLICATIONS

M. S. Howe, *Noise produced by a sawtooth trailing edge*, J. Acoust Soc. Am., 90(1), 1991, pp. 482–487.
F. Hagg et al., *National Aero–Acoustic Research on Wind Trubines in the Netherlands*, 1993, 5 pages.
Patent Abstracts of Japan, vol. 14, No. 243 (M–0977), Abstract of JP2064300, Mar. 5, 1990, 1 page.

Primary Examiner—Thomas E. Denion
Assistant Examiner—Mark Sgantzos
Attorney, Agent, or Firm—Webb Ziesenheim Bruening Logsdon Orkin & Hanson

[57] ABSTRACT

In order to reduce the noise nuisance caused during operation by rotor blades of a rotor of a wind turbine the rear edge of each blade is irregularly formed. In particular the sawtooth form with a top angle smaller than about 150° and preferably 10° is found to produce a considerable noise reduction.

19 Claims, 3 Drawing Sheets

WIND TURBINE

BACKGROUND OF THE INVENTION

1. Field of the Invention

The invention relates to a wind turbine with a rotor having a number of blades which each have a front edge and a rear edge.

2. Description of the Prior Art

A drawback to the use of wind turbines is the noise nuisance caused during operation by the rotor, and more particularly by the rotor blades.

SUMMARY OF THE INVENTION

It is the object of the invention to reduce this noise production. This is achieved according to the invention in that the rear edge of each blade is irregularly formed. More particularly, the rear edge of each blade has a saw-tooth form at least over a part. The saw teeth can take both a symmetrical and an asymmetrical form. The enclosed angle of the saw tooth is preferably smaller than about 150°, preferably 10°.

Practical tests have demonstrated that a considerable noise reduction is obtained with blades formed in this manner.

The invention is further elucidated with reference to the annexed drawings.

DESCRIPTION OF THE PREFERRED EMBODIMENTS

Figure 1:
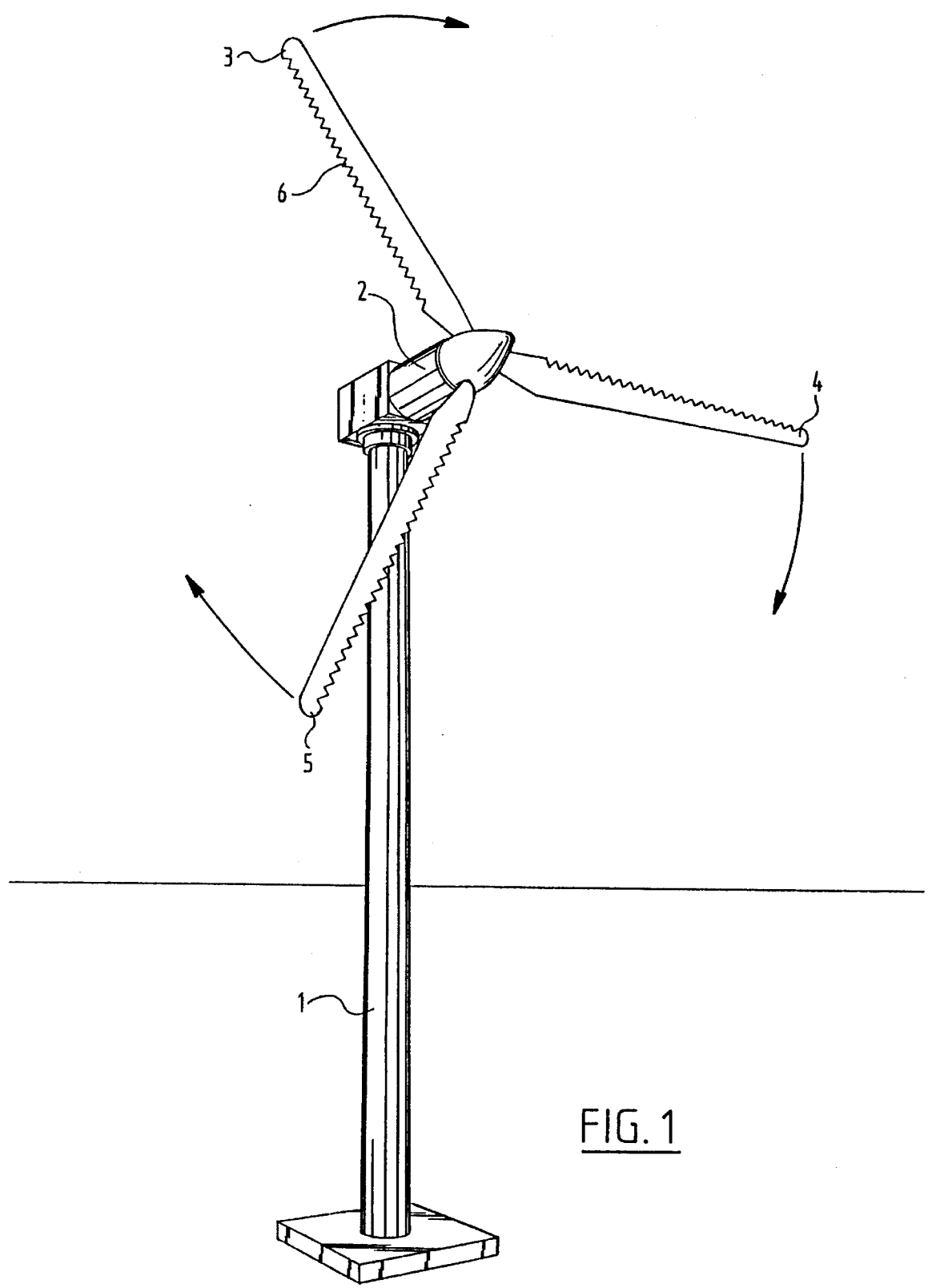
FIG. 1 shows an isometric view of a wind turbine according to the invention.

As, a wind turbine, for instance for generating electrical energy, comprises a mast 1, a rotor 2 and a number of, in the present embodiment three, blades 3, 4 and 5. According to the invention the rear edge of each blade, as seen in a rotation direction, is formed irregularly, for instance rear edge 6 of blade 3. The irregular form can have a different pattern. Examples are for instance a sinus-shaped pattern and a saw-tooth pattern. According to practical tests a saw-tooth pattern, whether symmetrical or not, with an enclosed angle a of each tooth of less than about 150° and preferably 10° produces the greatest noise reduction.

Figure 2:
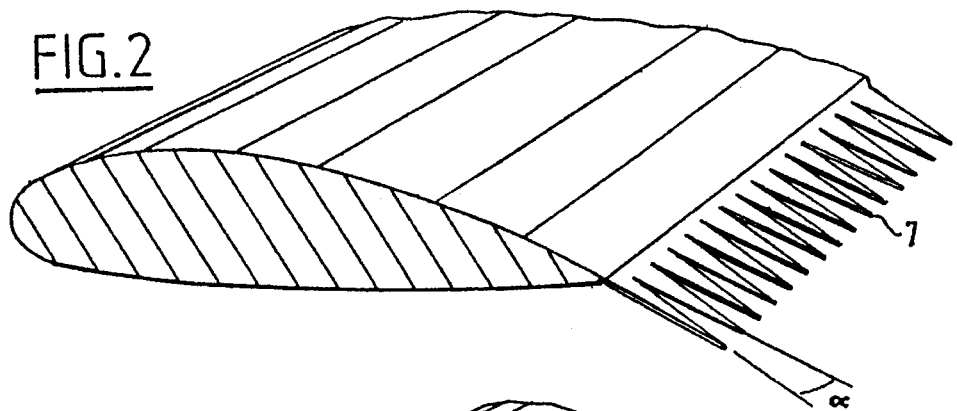
FIG. 2 shows a perspective view of a portion of a blade with a saw-tooth edge according to the invention a blade according to the invention.

When use is made of blades of curved cross section it is desirable for achieving the greatest noise reduction that the imaginary plane of the teeth according to the embodiment of FIG. 2 lies in the line of the curved plane acting as suction side. To implement this a saw tooth-shaped strip 7 can be used which is fixed in suitable manner to the rear edge of the blade.

Figure 3:
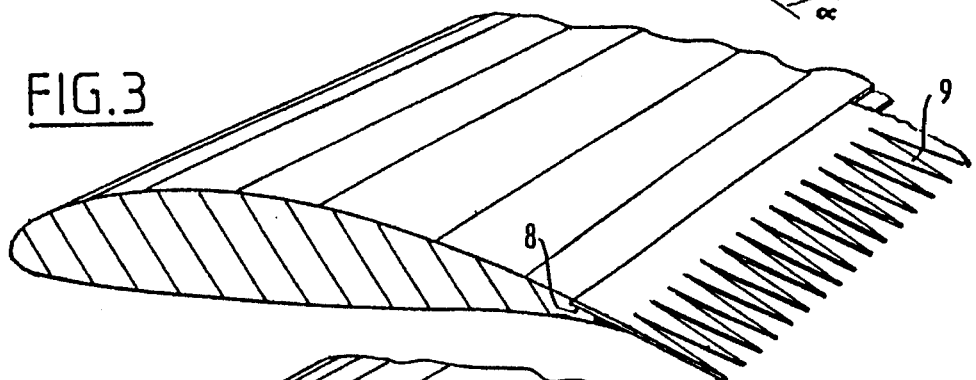
FIG. 3 shows an alternative embodiment of a blade according to the invention.

Also possible is an embodiment (FIG. 3) wherein a blunt rear edge is slightly chamfered 8, wherein a saw tooth-shaped strip 9 is fixed onto the chamfered pert such that the strip connects smoothly onto both the upper part and the lower part of the blade profile.

Figure 4:
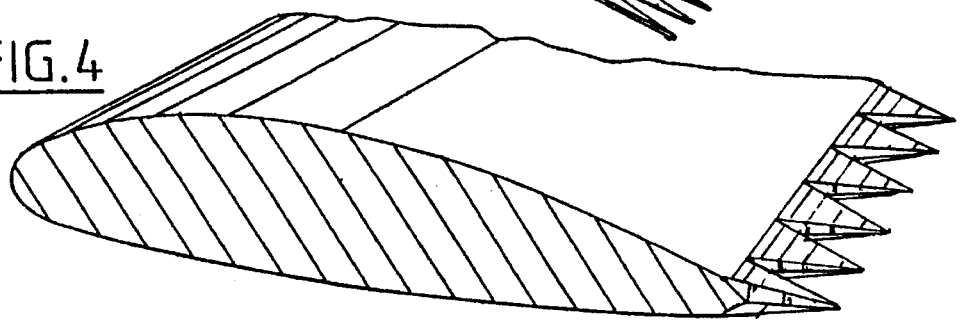
FIG. 4 shows an alternative embodiment of a blade according to the invention with cut-in saw teeth.
Figure 5:
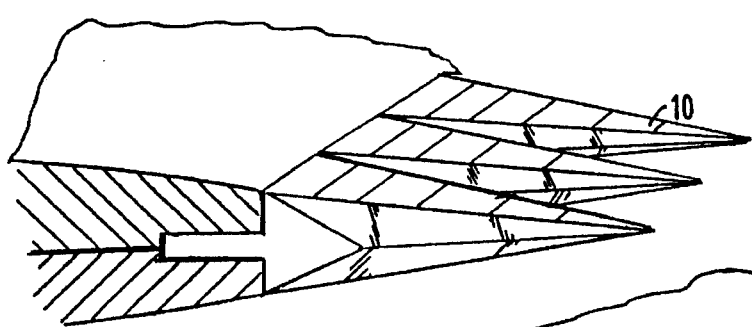
FIG. 5 shows an alternative embodiment the blade shown in FIG. 4.
Figure 6:
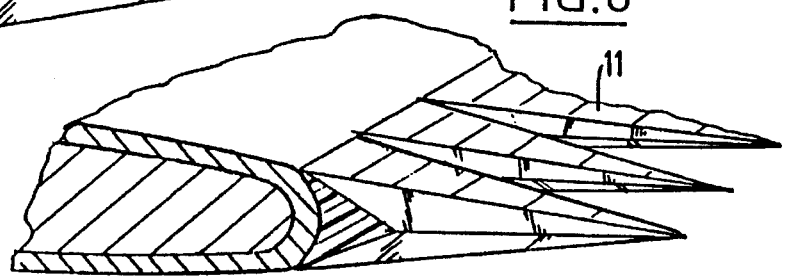
FIG. 6 shows another embodiment of a blade according to the invention.
Figure 7:
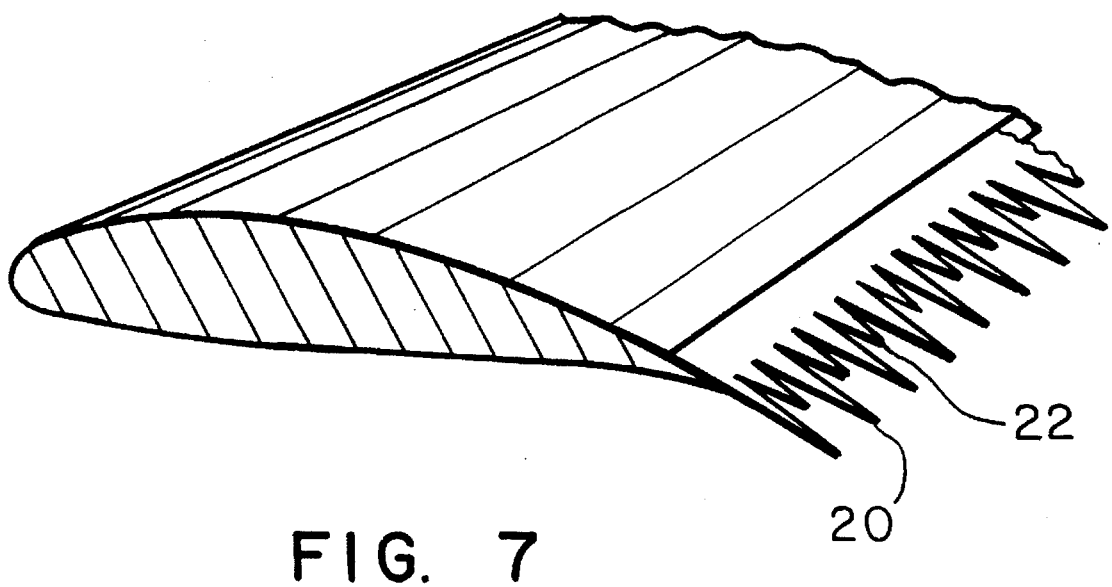
FIG. 7 shows an alternative embodiment of the blade having saw teeth differing from other saw teeth.
Figure 8:
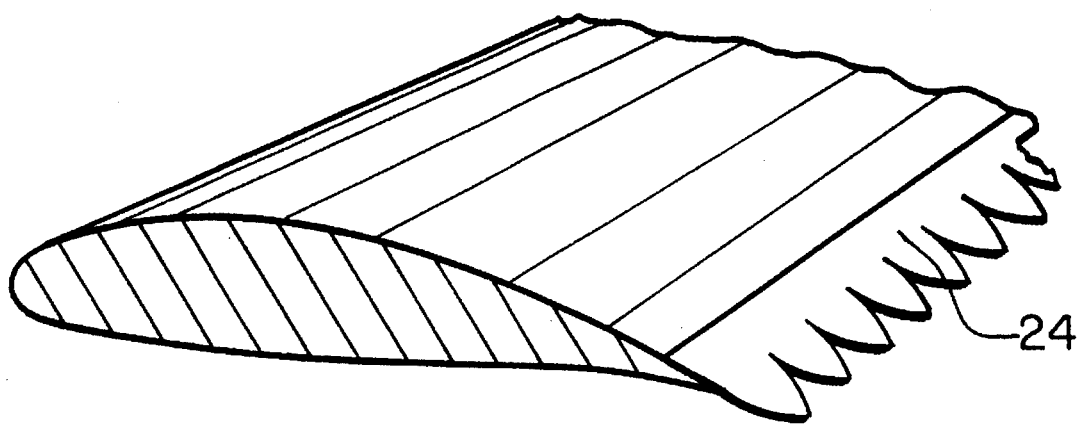
FIG. 8 shows an alternative embodiment of the blade in which the pattern of the rear edge is sinus-shaped in plan view.

It is also possible to cut the teeth into the blade itself (FIG. 4). It is also possible (FIG. 5), in the case of a blade constructed of shells, to place a saw tooth-shaped element 10 on the rear edge such that the least curved side of the cross section acting as pressure side also transposes smoothly into the element. In the case of a wound blade (FIG. 6) a saw tooth-shaped element 11 can be placed on the blunt rear end. As shown in FIGS. 4–6, the saw teeth may be shaped to have a hexagonal cross section. As shown in FIG. 7, the blade may have saw teeth 20 differing from other saw teeth 22. As shown in FIG. 8, the rear edge 24 of the blade may be sinus-shaped in plan view.

When cuts are made as according to FIG. 4 the chord length is reduced. In order to nevertheless obtain the intended chord length it is desirable to begin the cutting-in of the saw teeth at 80–95% of the intended chord length and have it end at 105–120% of the chord length. The margin depends on the chosen thickness of the profile. In this way is achieved that the average chord length is the intended chord length.

The blades from the wind turbine have a cross section, a curved part acting as a suction side and a part that is flatter in comparison to the curved part. A plane of the saw teeth lies roughly in an imaginary plane extending through the curved part. The edge thickness of the saw teeth is smaller than 4 mm. The pattern of the rear edge of the blade may be sinus-shaped in plan view.

What is claimed is:

1. A wind turbine comprising a rotor having a plurality of blades which each have a front edge and a rear edge, wherein the rear edge has a saw-tooth form having a plurality of saw teeth over at least a part thereof and wherein the saw teeth have a hexagonal cross section.

2. A wind turbine as claimed in claim 1, wherein the blades have in cross section a curved part acting as a suction side and a part that is flatter in comparison to the curved part, and a plane of the saw teeth lies roughly in an imaginary plane extending through the curved part.

3. A wind turbine as claimed in claim 2, wherein an edge thickness of the saw teeth is smaller than 4 mm.

4. A wind turbine as claimed in claim 2, wherein a top angle $\alpha$ of each of the saw teeth is less than about 150°.

5. A wind turbine as claimed in claim 2, wherein a top angle $\alpha$ of each of the saw teeth is about 10°.

6. A wind turbine as claimed in claim 2, wherein the saw teeth form part of a separate element fixed to a blade.

7. A wind turbine as claimed in claim 6, wherein an edge thickness of the saw teeth is smaller than 4 mm.

8. A wind turbine as claimed in claim 6, wherein a top angle $\alpha$ of each of the saw teeth is less than about 150°.

9. A wind turbine as claimed in claim 6, wherein a top angle $\alpha$ of each of the saw teeth is about 10°.

10. A wind turbine as claimed in claim 2, wherein the saw teeth are cut into the blade.

11. A wind turbine as claimed in claim 10, wherein an edge thickness of the saw teeth is smaller than 4 mm.

12. A wind turbine as claimed in claim 10, wherein a top angle $\alpha$ of each of the saw teeth is less than about 150°.

13. A wind turbine as claimed in claim 10, wherein in the case of a blade with a particular intended length of a chord, the cutting-in of the saw teeth begin at a point at 80–95% of the length of the chord and the saw teeth end at a point at 105–120% of the length of the chord.

14. A wind turbine as claimed in claim 13, wherein a position of the point of cutting-in of the saw teeth is chosen partly subject to the thickness of the blade.

15. A wind turbine as claimed in claim 1, wherein an edge thickness of the saw teeth is smaller than 4 mm.

16. A wind turbine as claimed in claim 1, wherein saw teeth differ from other saw teeth.

17. A wind turbine as claimed in claim 1, wherein a pattern of the rear edge is sinus-shaped.

18. A wind turbine as claimed in claim 1, wherein a top angle $\alpha$ of each of the saw teeth is less than about 150°.

19. A wind turbine as claimed in claim 1, wherein a top angle $\alpha$ of each of the saw teeth is about 10°.

* * * * *